United States Patent
Waldhauser et al.

(10) Patent No.: US 10,193,712 B2
(45) Date of Patent: Jan. 29, 2019

(54) MOBILE TERMINAL DEVICE AND METHOD FOR PROCESSING SIGNALS

(71) Applicant: Intel IP Corporation, Santa Clara, CA (US)

(72) Inventors: Dirk Waldhauser, Munich (DE); Clemens Buchacher, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/356,776

(22) Filed: Nov. 21, 2016

(65) Prior Publication Data

US 2017/0180159 A1 Jun. 22, 2017

(30) Foreign Application Priority Data

Dec. 21, 2015 (DE) .................. 10 2015 122 336

(51) Int. Cl.
*H04L 25/03* (2006.01)
*H04B 1/10* (2006.01)
*H04B 1/12* (2006.01)

(52) U.S. Cl.
CPC ..... *H04L 25/03006* (2013.01); *H04B 1/1081* (2013.01); *H04B 1/123* (2013.01); *H04L 25/03114* (2013.01); *H04L 2025/03471* (2013.01)

(58) Field of Classification Search
CPC ...... H04B 10/6971; H04L 2025/03624; H04L 2025/03656; H04L 2025/037; H04L 25/03038; H04L 25/03057; H04L 25/03878

See application file for complete search history.

(56) References Cited

U.S. PATENT DOCUMENTS

| 7,266,168 B2* | 9/2007 | Kwak | H04B 1/71055 375/347 |
| 2007/0064845 A1* | 3/2007 | Phanse | H04B 10/6971 375/348 |
| 2009/0252139 A1* | 10/2009 | Ludovico | H04W 16/32 370/342 |

OTHER PUBLICATIONS

German Office Action based on Application No. 10 2015 122 336.8 (6 Pages) dated Nov. 3, 2016 (Reference Purpose Only).

\* cited by examiner

*Primary Examiner* — Janice N Tieu
(74) *Attorney, Agent, or Firm* — Viering, Jentschura & Partner mbB

(57) ABSTRACT

A method for processing a receive radio signal is provided. The method may include receiving in a mobile device a receive radio signal, equalizing the receive radio signal using a first equalizer to generate a first equalized receive radio signal, equalizing the receive radio signal using a second equalizer to generate a second equalized receive radio signal, re-synthesizing a transmit signal from the second equalized receive radio signal, calculating a subtraction signal based on the re-synthesized transmit signal, and subtracting the subtraction signal from the equalized receive radio signal.

19 Claims, 5 Drawing Sheets

MOBILE TERMINAL DEVICE AND METHOD FOR PROCESSING SIGNALS

RELATED APPLICATIONS

This application claims priority of German patent application No. 10 2015 122 336.8, filed on Dec. 21, 2015, the entire contents of which are hereby incorporated herein by reference.

TECHNICAL FIELD

Various aspects of this disclosure generally relate to mobile terminal devices and methods for processing signals.

BACKGROUND

High data rate wireless communication systems such as high speed packet access (HSPA) or long-term evolution (LTE) may suffer from severe inter-symbol interference due to multipath propagation in physical transmission channels. A conventional mitigation of this kind of problem in a code division multiple access (CDMA) system such as high speed downlink packet access HSDPA is to use a linear (fractionally) spaced chip-level equalizer in the base-band which is designed according to an optimization criterion of choice like minimum mean square error (MMSE) or maximum signal-to-noise ratio (SNR) at the equalizer output. The equalization stage is then followed by a despreading stage, a symbol-detection stage and a demodulation stage before channel decoding can take place. The quality of the equalization and symbol detection stage is determining the amount of redundancy which is necessary to decode the transmitted code-word without errors in the channel decoder and, therefore, the achievable throughput in bits per second (bps) on the physical layer.

SUMMARY

A method for processing a receive radio signal is provided. The method may include receiving in a mobile device a receive radio signal, equalizing the receive radio signal using a first equalizer to generate a first equalized receive radio signal, equalizing the receive radio signal using a second equalizer to generate a second equalized receive radio signal, re-synthesizing a transmit signal from the second equalized receive radio signal, calculating a subtraction signal based on the re-synthesized transmit signal, and subtracting the subtraction signal from the equalized receive radio signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
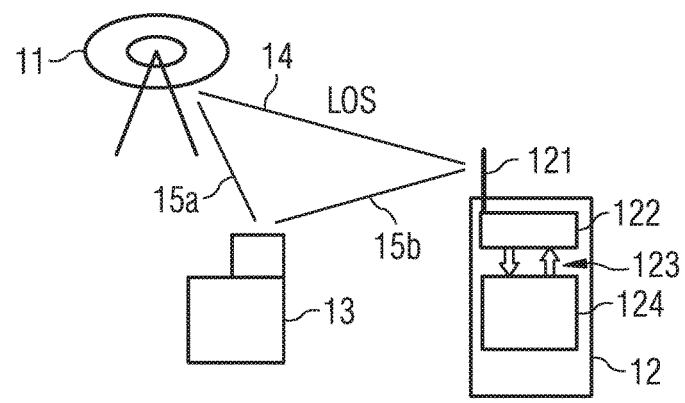
FIG. 1 shows a block diagram of a mobile communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1x1 vector (e.g. a scalar), a 1xM vector (e.g. a row vector), and an Mx1 vector (e.g. a column vector). Similarly, it is appreciated that references to a "matrix" may refer to matrix of any size or orientation, e.g. including a 1x1 matrix (e.g. a scalar), a 1xM matrix (e.g. a row vector), and an Mx1 matrix (e.g. a column vector).

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, femto base station, NodeB, evolved NodeBs (eNB), Home eNodeB, Remote Radio Head (RRH), relay point, etc.

It is appreciated that the following description may detail exemplary scenarios involving mobile device operating according to certain 3GPP (Third Generation Partnership Project) specifications, notably Universal Mobile Telecommunications System (UMTS) and any of its extensions such as High Speed Packet Access (HSPA), High Speed Downlink Packet Access (HSDPA) and High Speed Uplink Packet Access (HSUPA). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), Long Term Evolution (LTE) and Long Term Evolution-Advanced (LTE-A), and future mobile communication technologies and standards such as e.g. 5G, etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

Unless explicitly specified, the terms "transmit" and "send" encompass both direct and indirect transmission/sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source (e.g. through one or more secondary agents).

In an HSPA network architecture as specified by the 3rd Generation Partnership Project (3GPP), base stations and mobile terminals may utilize CDMA. CDMA is a spread-spectrum multiple access technique that spreads the bandwidth of the data uniformly for the same transmitted power. A spreading code is generated by a generator which provides a Walsh-Hadamard transform and which is designed to produce orthogonal codes for the same user or different users. In CDMA a locally generated code runs at a higher rate than the data to be transmitted. This results in a plurality of so called chips. Each chip to be transmitted by a transmitter is XORed by the pseude-random code (which may also be referred to as pseude-random scrambling code). For example, 128 chips per bits may be generated. It is to be noted that the number of chips may be dependent on the spreading factor of the used code.

Each user, i.e. mobile terminal, in a CDMA system uses a different code to spread its bit stream. Choosing the codes used to spread the bit stream is very important in the performance of CDMA systems. The best performance will occur when there is good separation between the chip sequence of a desired user and the chip sequence of other users, i.e. when the chip sequences are orthogonal to each other. As mentioned above, one single user may get more than one code. Also for this purpose a good separation of the codes may be provided. This can be achieved by designing the different codes to be orthogonal to each other.

Separation of the chip sequences in a mobile terminal is made by correlating the received chip sequence with the locally generated code of the desired user, referred to as despreading the received chip sequence as the original bandwidth is thus restored. As the different codes are designed to be orthogonal, separation of different users or from one single user becomes possible. Hence, if the chip sequence matches the desired user's code then the correlation function will be high and the system can extract that chip sequence. Otherwise, the chip sequence will have near zero correlation with the locally generated code of the desired user, thus making it is impossible to restore the originally transmitted bit stream.

The present disclosure addresses a technique which may improve the equalization and symbol detection stage in highly frequency-selective channels in order to increase the achievable throughput on physical layer.

FIG. 1 shows mobile communication network including a base station 11 and mobile terminal 12. The mobile terminal may be served by a first cell of base station 11, where base station 11 may be composed of one or more cells (not explicitly shown denoted in FIG. 1). The first cell could be any arbitrary cell. The mobile communication network may be e.g. an HSPA communication network. However, it is understood that the description provided herein is considered applicable to various other mobile communication technologies, both existing and not yet formulated, e.g. in cases where such mobile communication technologies share similar features as disclosed regarding the following examples.

As illustrated in FIG. 1, mobile terminal 12 may include antenna 121, radio frequency (RF) transceiver 122, radio frequency-base-band (RF-BB) interface 123 and base-band modem 124. The aforementioned components of mobile terminal 12 may be implemented as separate components. However, it is appreciated that the architecture of mobile terminal 12 depicted in FIG. 1 is for purposes of explanation, and accordingly one or more of the aforementioned components of mobile terminal 12 may be integrated into a single equivalent component or divided into two separate components with collective equivalence. It is understood that mobile terminal 12 may have one or more additional components, such as additional hardware, software, or firmware elements. For example, mobile terminal 12 may further include various additional components including hardware, firmware, processors, microprocessors, memory, and other specialty or generic hardware/processors/circuits, etc., in order to support a variety of additional operations. Mobile terminal 12 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc. Specifically mobile terminal 12 may include a BB-RF interface memory to store radio samples.

It is appreciated that the aforementioned components of mobile terminal 12, for example, RF transceiver 122, BB-RF interface 123 and base-band modem 124 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

The radio frequency processing unit (RF transceiver 122) may process a radio signal received via antenna 121 that has been transmitted over a radio channel and convert them down to base-band and then pass them to RF-BB interface 123. The radio channel may include a line of sight path 14 as shown in FIG. 1 as well as a non-line of sight path 15a, 15b when the radio signal is reflected at building 13 for example. Hence, a radio signal transmitted from base station 11 may reach antenna 121 directly via the line of sight path 14 and a retarded copy or various retarded copies of the radio signal may reach antenna 121 via non-line sight path 15a, 15b. This scenario is referred to as multipath propagation. The radio signal and its retarded copy or copies superimpose at antenna 121. Thus, the retarded copy or copies thus may interfere with the radio signal received from the line of sight path 14. This phenomenon is referred to as inter-symbol interference (ISI). Base-band modem 124 that receives down converted radio samples from RF-BB interface 123 has to take into account ISI for correct detection.

In an abridged overview of the operation of mobile terminal 12, mobile terminal 12 may be configured to receive and/or transmit wireless signals according to multiple different wireless access protocols or radio access technologies (RATs), including any one of, or any combination of, HSPA (High Speed Packet Access), LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile terminal 12 may be determined by one or more Subscriber Identity Modules (SIM) included in mobile terminal 12 (not explicitly shown in FIG. 1). It is appreciated that separate components may be provided for each distinct type of compatible wireless signals, such as a dedicated LTE antenna, RF transceiver, and base-band modem for LTE reception and transmission and a dedicated WiFi antenna, RF transceiver, and base-band modem for WiFi reception and transmission.

Alternatively, one or more components of mobile terminal 12 may be shared between different wireless access protocols, such as e.g. by sharing antenna 121 between multiple different wireless access protocols. In an aspect of disclosure, RF transceiver 122 and/or base-band modem 124 may be operate according to multiple mobile communication access protocols (i.e. "multi-mode"), and thus may be configured to support one or more of HSPA, LTE, UMTS, and/or GSM access protocols. Alternatively, one or both of RF transceiver 122 and base-band modem 124 may be divided into two separate components, where each component is dedicated to a single radio access technology.

Further according to the abridged overview of operation of mobile terminal 12, RF transceiver 122 may receive radio frequency wireless signals via antenna 121, which may be implemented as e.g. a single antenna or an antenna array composed of multiple antennas. RF transceiver 122 may include various reception circuitry elements, which may include e.g. analog circuitry, configured to process externally received signals, such as mixing circuity to convert externally received RF signals to base-band and/or intermediate frequencies. RF transceiver 122 may also include amplification circuitry to amplify externally received signals, such as power amplifiers (PAs) and/or Low Noise Amplifiers (LNAs), although it is appreciated that such components may also be implemented separately. RF transceiver 122 may additionally include various transmission circuitry elements configured to transmit internally received signals, such as e.g. base-band and/or intermediate frequency signals provided by base-band modem 124, which may include mixing circuitry to modulate internally received signals onto one or more radio frequency carrier waves and/or amplification circuitry to amplify internally received signals before transmission. RF transceiver 122 may provide such signals to antenna 121 for wireless transmission. Further references herein to reception and/or transmission of wireless signals by mobile terminal 12 may thus be understood as an interaction between antenna 121, RF transceiver 122, and base-band modem 124 as detailed above.

Figure 2:
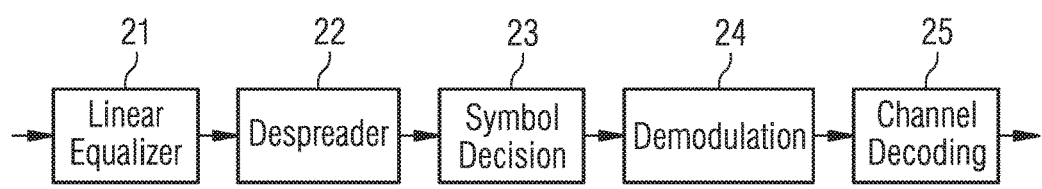
FIG. 2 shows a block diagram of a state of the art CDMA receiver.

FIG. 2 shows a block diagram illustrating an internal configuration of base-band modem 124 of FIG. 1. The base-band modem 124 may include a linear equalizer 21, a despreader 22, a symbol detector 23, a demodulator 24 and a channel decoder 25. These base-band modem stages (which may also be referred to as base-band modem circuits) basically reverse the signal processing done at the transmitter of a base station. The equalizer 21 accounts and compensates for the radio channel. A linear equalizer may be designed as a finite impulse response (FIR) filter that is designed with respect to some optimization criterion like minimum mean square error (MMSE) or maximum signal-to-noise ratio (SNR). It may work on fractionally spaced I/Q samples provided by the RF transceiver 122 and retrieved from BB-RF interface 123. The despreader transforms radio samples (chip sequences) back to their original domain. Symbol detector 23 takes decisions about the symbols based on the input received from despreader 22. Demodulator 24 generates bits which may be then decoded by channel decoder 25 to yield the most likely transmitted bit sequence.

Base-band modem 124 may include digital processing circuit(s), i.e. one or more digital processing circuits, a protocol processor, base-band memory and one or more additional stages, although not explicitly shown in FIG. 1 to implement the internal configuration as described above. Digital processing circuit(s) may be composed of various processing circuitry configured to perform base-band (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) may include hardware, software, or a combination of hardware and software. By way of example, digital processing circuit(s) of base-band modem 124 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base-band modem 124 may be detailed herein substantially in terms of functional operation in recognition that a person of skill in the art may readily appreciate the various possible structural realizations of base-band modem 124 using digital processing circuitry that will provide the desired functionality.

Figure 3:
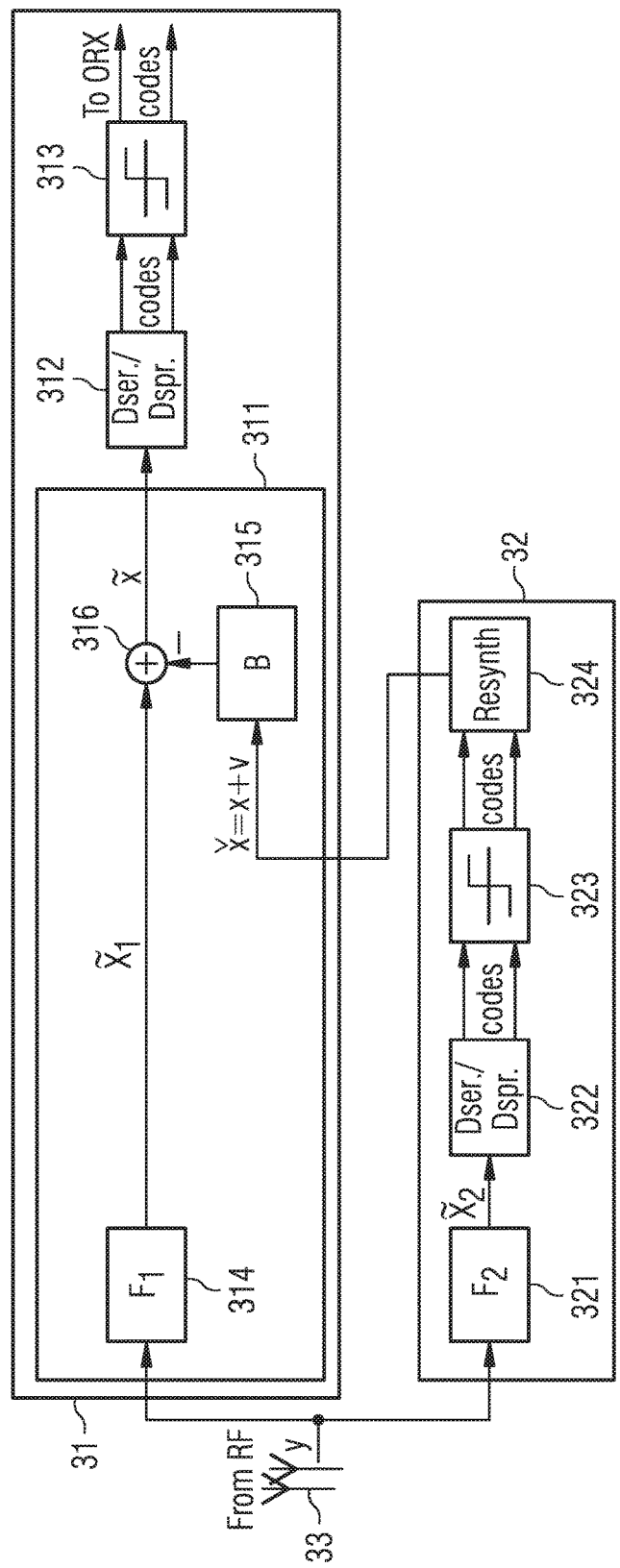
FIG. 3 shows a block diagram of receiver employing interference cancellation having two receive branches.

FIG. 3 shows a block diagram illustrating another internal configuration of base-band modem 124 of FIG. 1. The base-band modem 124 may include two receive branches, a highest receive branch 31 and a lowest receive branch 32 that both process the same radio samples y provided by RF transceiver 33.

The lowest receive branch 32 may include a second equalizer 321 configured to equalize the received radio signal y to generate and thus obtain a second equalized receive radio signal and re-synthesizer 324 configured to re-synthesize a transmit signal from the second equalized receive radio signal to generate and thus obtain a re-synthesized transmit signal. The skilled person will appreciate that in order to re-synthesize the transmit signal, a despreader 322 and a symbol detector 323 may be employed.

The highest receive branch 31 may include a first equalizer 314 configured to equalize the received radio signal to generate and thus obtain a first equalized received radio signal. The highest receive branch 31 may further include a filter 315 configured to filter the re-synthesized transmit signal of a preceding branch, i.e. the lowest the receive branch 32, to generate and thus obtain a subtraction signal. The highest receive branch 31 may further include a subtractor 316 configured to subtract the subtraction signal from the first equalized receive radio signal. The skilled person will appreciate that the first equalizer 314, the filter 315 and the subtractor 316 form an equalizer 311. The highest receive branch 31 may further include a despreader 312 and a symbol detector 313. A non-linearity may be introduced by the transmit signal reconstruction (symbol decision, signal re-synthesis), i.e. by the signal which may be fed into a further FIR filter, which will described in more detail below.

As described above a mobile terminal may implement a method for processing a radio signal that includes receiving in a mobile device a receive radio signal, equalizing the receive radio signal using a first equalizer to generate and thus obtain a first equalized receive radio signal, equalizing the receive radio signal using a second equalizer to generate and thus obtain a second equalized receive radio signal, re-synthesizing a transmit signal from the second equalized receive radio signal, calculating a subtraction signal based on the re-synthesized transmit signal, and subtracting the subtraction signal from the equalized receive radio signal.

According to various aspects of this disclosure, filter 315 represents a residual multipath response B of a radio channel. The residual multipath response may be given by the cascade of a radio channel (not depicted in FIG. 3) and the first equalizer 314 minus the correctly delayed Dirac delta impulse response, i.e. the main tap of the radio channel. As already mentioned, subtractor 316 subtracts a subtract signal composed of a re-synthesized and filtered transmit signal of a preceeding receive branch from the first equalized receive radio signal. The substract signal can be thus be designed in a way to represent the (negative) remaining multipath interference present at the output of the other equalizer 314. In this manner, inter-symbol interference can be removed non-linearly without any noise enhancement (or SNR degradation) effect. The final symbol decision depicted at the output of symbol detector 313 in FIG. 3 may be followed by demodulation and channel decoding stages (not shown in FIG. 3).

One advantage compared to a linear minimum mean square error (LMMSE) equalizer is provided by the non-linear symbol decision before transmit signal reconstruction. Note, that for the subtraction of the multipath interference reliable symbol decisions are desirable. In order to achieve this, a high signal-to-noise ratio and/or robust modulation schemes like QPSK may be provided. Otherwise, soft decision techniques can be used because they intrinsically attenuate unreliable symbols by scaling them down. Moreover, a successive cancellation approach can be applied which only cancels reliable symbols in a first stage, which in turn leads to higher reliability of initially weak symbols in later processing stages, which can be then subtracted again and so on.

Filter 315 may thus be designed such that the resulting subtraction signal processed by subtractor 316 represents a multipath interference contained in the other equalized radio signal. However, filter 315 may be also be designed such that the resulting subtraction signal processed by subtractor 316 represents a neighbor cell interference contained in the other equalized radio signal. The filter coefficients determine the type of interference, i.e. neighbor cell or multipath.

Various aspects of the present disclosure relate to different designs of the first equalizer 314 having equalizer coefficient matrix $F_1$, the second equalizer 321 having equalizer coefficient matrix $F_2$ and cancellation filter 315 having filter coefficient matrix B. Note that the size of the equalizer coefficient matrices and the cancellation filter coefficient matrix is dependent on the number of receive antennas. Further note that the antenna 121 in FIG. 1 may thus be an antenna array.

The first equalizer 314 having equalizer coefficient matrix $F_1$ in the highest receive branch 31 may be designed as a (Linear) Minimum Mean Square Error (MMSE) equalizer. Equalizer coefficient matrix $F_1$ of the first equalizer 314 may be identical to equalizer coefficient matrix $F_2$ of the second equalizer 321 that has been computed in the second receive branch 32 to minimize the mean square error between an output signal of the second equalizer 321 and the transmit signal. In this case the coefficients of cancellation filter 315 having filter coefficient matrix B have to reflect the residual multipath interference of the equalizer output ($F_1$ or $F_2$, respectively), which is obtained by subtracting the Dirac delta impulse response with the correct delay from the equalizer-channel cascade ($h[n]*f_1[n]$), where $h[n]$ is the channel impulse response, $f_1[n]$ is the impulse response of the first equalizer 314 in the first receive branch 31 (which corresponds to the matrix notation $F_1$) and "*" shall represent the convolution between the sequences.

In other words: choose $F_1=F_2=(\sigma_x^2 HH^H+\sigma_n^2 I)^{-1}\sigma_x^2 He_p$ corresponding to the linear MMSE solution and B as the cascade filter matrix representing the convolution between the channel impulse response h and function $f_1$ of the first equalizer 314 minus the Dirac delta impulse response for the correct delay and downsampling by a factor "2". $\sigma_x^2$ corresponds to the signal energy, whereas $\sigma_n^2$ corresponds to the energy of the additive white Gaussian noise n, $e_p$ denotes the unit vector with the "1" entry accomplishing the desired delay. Subtracting the Dirac delta impulse response for the correct delay adjusts the cascade of radio channel and first equalizer 314 by the main tap, i.e. the main tap is removed from the impulse response of the cascade. This way remaining or at least parts of the remaining inter-symbol interference can be removed from the equalized output chip sequence of the first equalizer 314, which improves the subsequent decision performance.

In case the symbol decisions and the re-synthesized signal are perfect, the multipath interference may be cancelled completely apart from channel estimation errors and limitations given by the equalizer coefficient computation. As the second receive branch 32 is able to remove the multipath interference as long as the re-synthesized signal is reliable enough, it even appears to be more attractive to use the degrees of freedom of the equalizer $F_1$ to suppress noise rather than taking care of multipath interference.

The first equalizer 314 having equalizer coefficient matrix $F_1$ in the highest receive branch 31 may be designed as a matched filter. Equalizer coefficient matrix $F_1$ may be matched to the radio channel impulse response in order to suppress the noise as much as possible. The cancellation filter 315 having filter coefficient matrix B in this case may remove the multipath interference which may again be given as cascade of the radio channel and the equalizer coefficient matrix $F_1$ minus the Dirac delta impulse response with the correct delay. Equalizer coefficient matrix $F_1$ of the equalizer-channel cascade is a matched filter in this case. Inter-symbol interference is not suppressed at all by the first equalizer 314 because it is subtracted in the next processing stage anyway. The cancellation filter matrix B is, therefore, designed to represent the cascade of the channel and the matched channel impulse response of the first equalizer 314 adjusted by the main tap.

In other words: choose $F_1=H^H$ (as matched filter to the channel impulse response) and $F_2=(\sigma_x^2 HH^H+\sigma_n^2 I)^{-1}\sigma_x^2 He_p$ as the linear MMSE solution and B as the cascade filter matrix representing the convolution between the channel impulse response h and the equalizer filter $f_1$ minus the Dirac delta impulse response for the correct delay and downsampling by 2. The multipath interference at the output of the equalizer in the first receive branch 31 is supposed to be rather large for typical propagation channels.

The first equalizer 314 having equalizer coefficient matrix $F_1$ in the highest receive branch 31 and the cancellation filter 315 having filter coefficient matrix B may be configured to jointly minimize a mean squared estimation error. A joint optimization of both the filter coefficient matrix B and the equalizer coefficient matrix $F_1$ is disclosed in the following which automatically weights the contribution of the re-synthesized transmit signal and equalization in the first receive branch 31 depending on the quality of the re-synthesized transmit signal.

As the contribution of the re-synthesized transmit signal $\tilde{x}$ affects the joint solution $\tilde{x}$, it is desirable to re-synthesize this transmit signal reliably, hence to reconstruct the output signal $\tilde{x}_2$ of the second equalizer 321 reliably. This may be achieved by an optimization which takes the signal to noise ratio (SNR) of the reconstructed signal in the second receive branch 32 into account. The objective is to find $\min_{F_1,B} E[\|\tilde{x}-x\|^2]$, i.e. to provide filter coefficients leading to the minimum mean squared error (MSE) solution for the receiver structure disclosed in FIG. 3, where $\tilde{x}$ corresponds to the estimate of x already taking the "multipath cancellation" into account, where x is the original transmit signal at a transmitter side, for example base station 11 in FIG. 1.

Figure 4:
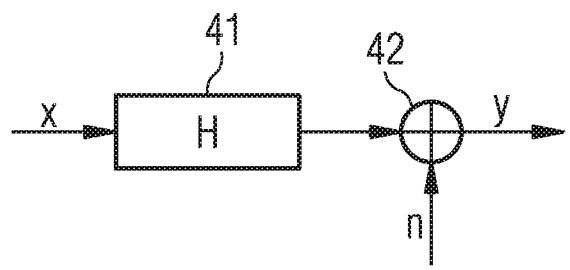
FIG. 4 shows a block diagram of a channel model.

Now referring to FIG. 4, the optimization will be explained with the depicted system model. The system model assumes a receive signal or observation y, which is obtained as the result of a multipath fading channel and i.i.d. additive white Gaussian noise $n_k \sim \mathcal{N}(0, \sigma^2)$ $$y=Hx+n,$$

where y, x and n are vectors and H is the channel matrix representing the channel impulse response in the convolution of the transmit signal x with the channel and the oversampling by factor of 2. The size of the matrix and the vectors is determined by the oversampling factor, the number of equalizer coefficients, the number of channel coefficients and the number of receive antennas. The receive signal y is then fed into the two branches (31 and 32 in FIG. 3) of the architecture which apply equalization, descrambling, despreading and symbol detection. The equalizer coefficients in the two branches as well as the filter coefficient matrix B may be designed to provide for a good estimate of the reconstructed transmit signal.

The second equalizer 321 in the second receive branch 32 equalizes the observation y equalizer coefficient matrix $F_2$, which contains the downsampling by the factor 2:

$$\tilde{x}_2 = F_2 y = F_2 H x + F_2 n.$$

The result is an estimation of the transmitted chip sequence $\tilde{x}_2$ which descrambler/despreader 322 descrambles and despreads into the estimated transmit symbols which symbol detector 323 decides. Symbol detector 323 either makes hard decisions based on the assumed modulation alphabet or any kind of soft decisions which take the SNR of the symbols after equalization into account. Based on the decided symbols and estimates of the applied code power, re-synthesizer 324 re-synthesizes the transmit signal again into $$\check{x} = x + v,$$

where v may be an Additive White Gaussian noise (AWGN) model of the estimation error which remains after symbol decision. Other models for this noise are, of course, also possible. This error may consist of thermal noise and residual interference. Of course, errors in the symbol decision can lead to a significant "noise" power at the output of the symbol detector 323. The noise variance at the output of the symbol detector 323 in the second receive branch 32 may represent a reliability information of the output of the second receive branch 32, therefore, determine the weighting of the two branches and the equalizer and cascade coefficient design.

The output signal of the first receive branch 31 before subtraction by subtractor 316 is given as:

$$\tilde{x}_1 = F_1 y = F_1 H x + F_1 n$$

Finally the equalizer 311 generates the estimated transmit sequence as:

$$\hat{x} = \tilde{x}_1 - B\check{x} = F_1 H x + F_1 n - B x - B v = (F_1 H - B) x + F_1 n - B v$$

Because cancellation filter 315 filters the replica of the transmit signal in the second receive branch 32 by B and subtracter 316 subtracts these replica from the equalized receive signal $\tilde{x}_1$ of the first receive branch 31, the signal quality before descrambling and despreading by descrambler/despreader 312 is improved.

Under special assumptions on the noise correlations the solution of the optimization problem stated above is given as $$f_1 = \left[\sigma_x^2 H H^H + \left(1 + \frac{\sigma_x^2}{\sigma_v^2}\right)\sigma_n^2 I\right]^{-1} \sigma_x^2 H e_p$$

$$b = \frac{\sigma_x^2}{\sigma_x^2 + \sigma_v^2}(H^H f_1 - e_p)$$

If $\sigma_v^2 = 0$, $\sigma_x^2 \neq 0$ and $\sigma_n^2 \neq 0$, i.e. the transmit signal re-synthesis in the second receive branch is working perfectly, it follows that $f_1 = 0$ and $b = -e_p$. If $\sigma_v^2 \gg \sigma_x^2$, it follows that $b = 0$ and $f_1$ corresponds to the MMSE solution given above.

If the re-synthesized transmit signal is already correct, i.e. $\check{x} = x$, no additional equalization in the first receive branch 31 is needed and the symbols are correctly obtained by descrambling and despreading. The minus sign of the cancellation is compensated by the minus in the formula for b. In all other cases it shows that the cascade is obtained by removing the main tap from the channel equalizer cascade weighted by $$\frac{\sigma_x^2}{\sigma_x^2 + \sigma_v^2}.$$

For small $\sigma_v^2 \neq 0$ this leads to a solution which is very close to the solution heuristically found for MMSE or the matched filter.

In principle, it may be observed that also the heuristic solutions above get some motivation by the optimum solution. The cascade filter b may be obtained by subtracting a Dirac delta impulse response from the equalizer channel cascade. The optimum solution should, therefore, represent an envelope of the heuristically motivated solutions at least as the complete transmit signal is reconstructed and not only the part based on "reliable" symbols. The optimization is based on subtraction of x. If only parts of it are subtracted, the remaining part may be considered in the noise portion v. The same may also be true for small soft values which are the result of unreliable symbol decisions. If $\sigma_v^2 \gg \sigma_x^2$, which means that the reconstructed transmit signal would not be very reliable, b gets small and the information from the second receive branch would be rather suppressed to not suffer from erroneous decisions. In this case the equalization in the first receive branch might degrade to state-of-the art linear equalization.

As already stated above, joint minimization of the estimation error by equalizer 314 and cancellation filter 315 may be based on modelling of the reconstructed transmit signal as the correct transmit signal plus a noise component: $\check{x} = x + v$. The reconstructed transmit signal may be obtained by choosing the equalizer coefficents of the second equalizer 321 according to the MMSE criterion. The modelling of the reconstructed transmit signal allows to perform a joint optimization of the equalizer coefficient of the first equalizer 314 and the filter coefficients of the cancellation filter 315 according to some criterion like the minimum mean square error between the estimated transmit chips before the input of descrambler/despreader 312 and the actually transmitted chips. For the special case where the reconstructed transmit signal is already correct (i.e. noise component is zero) the evident solution of the optimization leads to a cancellation filter B with a Dirac delta impulse response whereas the filter coefficient matrix $F_1$ of the first equalizer 314 only contains zero coefficients.

Various aspects of the present disclosure relate to successive inter-symbol interference subtraction. These aspects are based on the fact that parts of the signal may be either known, like the Common Pilot Channel (CPICH) pilot symbols, or can be detected with higher reliability, e.g. larger spreading factors, higher relative transmit power, than others. The interference of those parts is subtracted first. On the one hand this avoids that the signal quality is deteriorated by subtracting erroneous inter-symbol interference. On the other hand the equalizer optimization criterion used in any succeeding receive branch can neglect the signal parts which are subtracted later on anyway. This improves the equalizer performance for the remaining parts. This also means that further signal parts can be reliably detected in the corresponding receive branch and used for potential further subtraction in a succeeding receive branch. In this case the receiver architecture as shown in FIG. 3 may be extended accordingly by an additional receive branch or even a plurality of additional receive branches.

Figure 5:
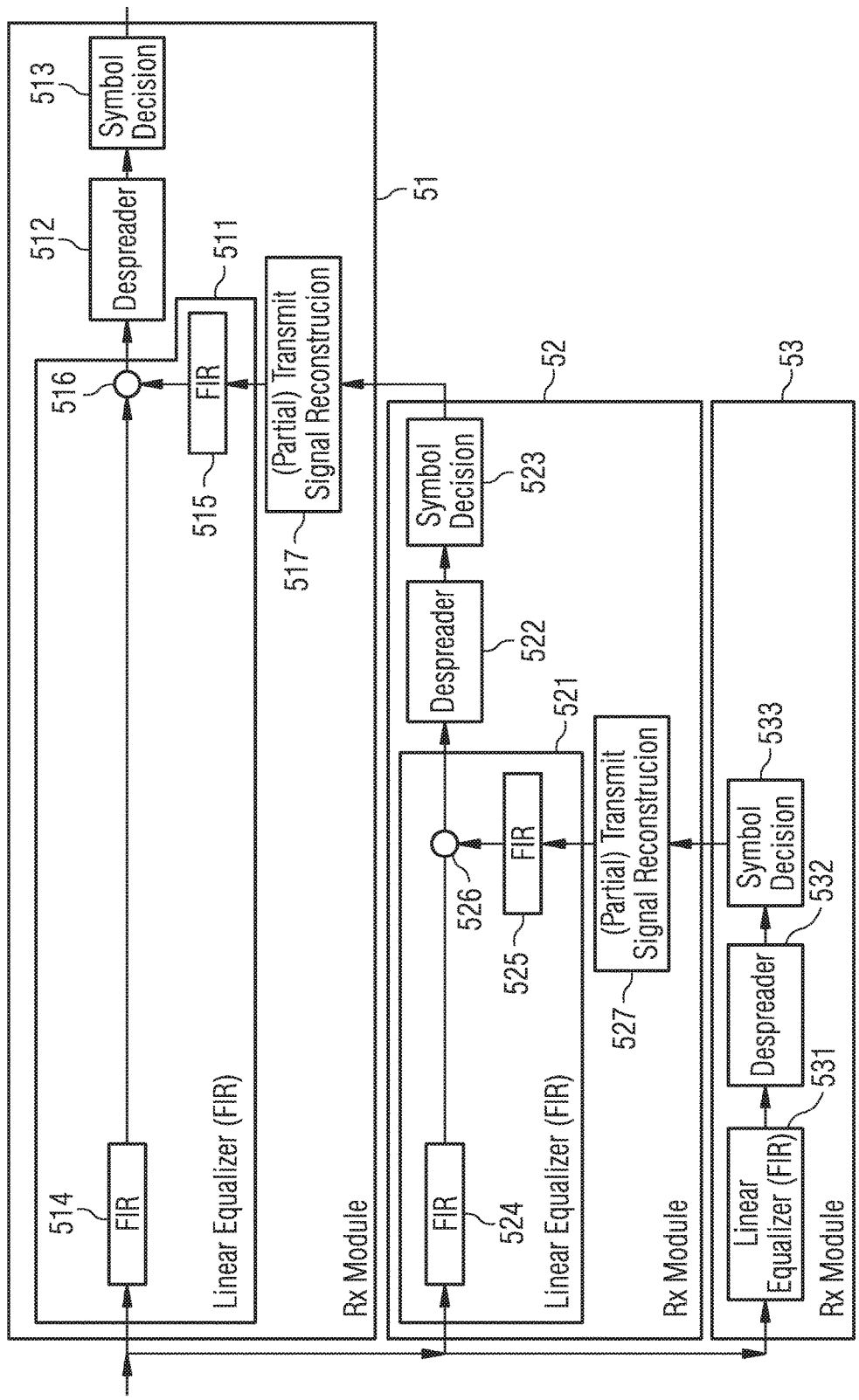
FIG. 5 shows a block diagram of receiver employing interference cancellation having three receive branches.

Now referring to FIG. 5, the receiver includes a lowest receive branch 53, a highest receive branch 51 and an intermediate receive branch 52 arranged between the lowest receive branch 53 and the highest receive branch 51. Each of the receive branches 51, 52, 53 includes an equalizer 514, 524, 531 followed by descrambler/despreader 512, 522, 532 followed by a symbol detector 513, 523, 533, respectively, to each form a complete receive radio signal reconstruction path. Equalizer 531 included in the lowest receive branch 53 equalizes a receive radio signal to generate and thus obtain an equalized receive radio signal. Intermediate receive branch 52 includes re-synthesizer 527 that re-synthesizes a transmit signal from the equalized receive radio signal of the lowest receive branch 53 to generate and thus obtain a re-synthesized transmit signal. Note, in this example re-synthesizer 527 is part of the intermediate receive branch 52. However, re-synthesizer 527 may instead be part of the lowest receive branch 53.

Re-synthesizer 527 may be configured to re-synthesize a transmit signal from the equalized receive radio signal of the lowest receive branch 53 by taking only into account parts of the equalized receive radio signal of the lowest receive branch 53 meeting a reliability criterion. Such parts may be known parts of the equalized receive radio signal like pilots. Alternatively, such parts may be parts of the equalized receive radio signal that have been coded with a spreading factor exceeding a spreading factor threshold or parts of the equalized receive radio signal that have been received with a transmit power exceeding a transmit power threshold. Cancellation filter 525 filters the thus re-synthesized transmit signal to determine either the residual inter-symbol interference or the residual neighbour cell interference. As only reliable parts are used to determine the interference, subtractor 526 less likely subtracts erroneous inter-symbol interference or neighbour cell interference compared to a configuration where re-synthesizer 527 would re-synthesize the entire, hence also unreliable parts of the, equalized receive radio signal of the lowest receive branch 53. Hence, subtractor 526 subtracts more reliable interference from the equalized receive radio signal generated by equalizer 524 that cancellation filter 525 determines, thus improving the reconstruction quality in the intermediate receive branch 52. Note that equalizer 524, cancellation filter 525 and subtractor 526 form equalizer 521.

Equalizer coefficient computation of equalizer 524 may consequently ignore parts of the receive radio signal that subtractor 526 subtracts, thus further improving the quality of the signal reconstruction in the intermediate receive branch 52. Hence, other parts of the radio receive radio signal may be reconstructed more reliably, thus meeting the reliability criteria. Re-synthesizer 517 re-synthesizes the reconstructed signal of the intermediate receive branch 52 that meets the reliability criteria. Thus, cancellation filter 515 filters the thus re-synthesized transmit signal to determine either the residual inter-symbol interference or the residual neighbour cell interference. As cancellation filter 515 filters only the reliable parts of the signal reconstructed in the intermediate receive branch 52 to determine the interference, subtractor 516 less likely subtracts erroneous inter-symbol interference or neighbour cell interference compared to a configuration where re-synthesizer 517 would re-synthesize the entire, hence also unreliable parts of the, equalized receive radio signal of the intermediate receive branch 52. Hence, subtractor 516 subtracts more reliable interference from the equalized receive radio signal generated by equalizer 514 that cancellation filter 515 determines, thus improving the reconstruction quality in the highest receive branch 51. Note that equalizer 514, cancellation filter 515 and subtractor 516 form non-linear equalizer 511. Further note, that in this example re-synthesizer 517 is part of the highest receive branch 51. However, re-synthesizer 517 may instead be part of the intermediate receive branch 52.

Equalizer coefficient computation of equalizer 514 may also consequently ignore parts of the receive radio signal that subtractor 516 and subtractor 526 subtracts, thus further improving the quality of the signal reconstruction in the highest receive branch 51. The highest receive branch 51 may be followed by a demodulator and a channel decoder (not shown in FIG. 5). Note, that equalizers 514, 524 and 531 can be of the MMSE type. However, any of equalizers 514, 524, 531 can also be of the MF type. Furthermore, equalizer and cancellation filter of any of the receive branches may be designed to jointly minimize the estimation error.

Various aspects of the present disclosure relate to successive noise reduction.

Again referring to FIG. 5, the concept behind this receiver architecture is to do the equalization successively in a way that reliably detected parts are subtracted by means of additional receive branches, e.g. third receive branch 53 additional to first receive branch 51 and second receive branch 52, so that the equalization of the remaining part does not need to spend any degrees of freedom for those parts anymore. Apart from targeting reliable or known channels like CPICH or (Quaternary Phase Shift Keying) QPSK modulated channels, this concept can be further extended even to noise. A principle here is that the detected noise is not regarded as part of the input signal to the equalizer in subsequent branches anymore and has, therefore, influence on the calculated equalizer coefficients.

Again referring to FIG. 5. For example in the lowest receive branch 53, equalizer 531 is designed to reconstruct the noise by suppressing any signal portion. Equalizer 524 of subsequent receive branch 52 is designed not to consider the reconstructed noise. Hence, the reconstructed noise is not regarded as part of the input signal to equalizer 524. Instead, subtractor 526 subtracts the reconstructed noise at the output of equalizer 524. This may give a better estimate of the signal than by taking the noise into account in the calculation of the filter coefficients of equalizer 524. With this estimate the known or very reliably detected symbols in the signal can be reconstructed and subtracted from the subsequent highest receive branch 51. In the highest receive branch 51 equalizer 514 does not have to take into account the noise and the reliably detected signal part of the previous receive branch 52 any more. This may allow for a better signal estimate of the missing signal part.

Figure 6:
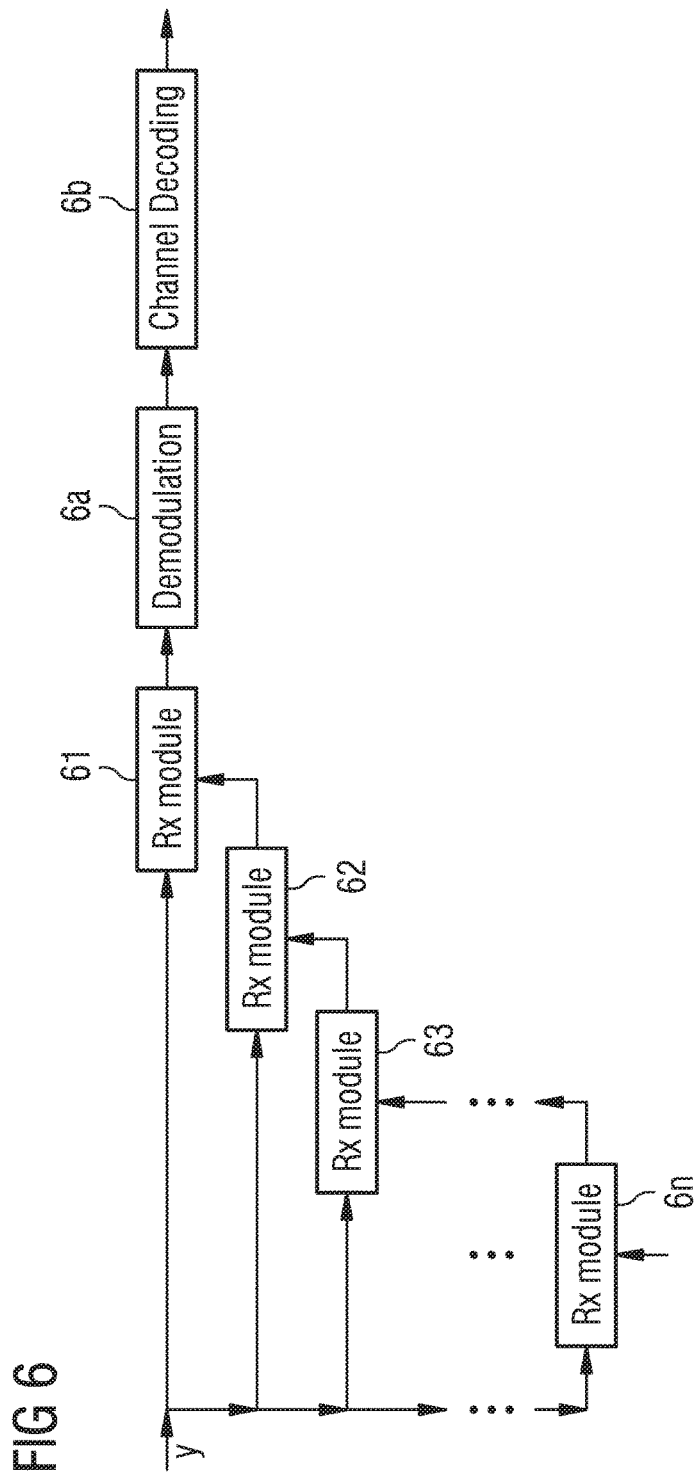
FIG. 6 shows a block diagram of receiver employing interference cancellation having a plurality of receive branches.

Various aspects of the present disclosure relate to a general extension of the receiver architecture as shown in FIG. 5. This receiver architecture can be extended by an arbitrary number n of successive cancellation stages, i.e. receive branches 61, 62, . . . 6n as shown in FIG. 6, to implement successive inter-symbol interference cancellation and/or (successive) neighbor cell interference cancellation simultaneously. Any of the receive branches 61, 62, 6n may use only the reliable parts of the reconstructed transmit signal for interference subtraction from a preceding receive branch. This avoids degradations by subtracting erroneous interference and allows a succeeding receive branch to ignore the parts of the signal in its equalizer design which are cancelled by the subtraction path anyway. Consequently, any receive branch may produce estimates of further parts of the transmit signal with higher reliability that can again be subtracted from succeeding receive branch. Starting from a lowest receive branch $6n$, this procedure can be continued until either all parts are already subtracted or the reliability of the reconstructed signal gets too low to be considered for further cancellation. Which type of interference (inter-symbol or neighbour cell) is solely determined by the choice of the filter coefficients of the cancellation filter in receive branch.

Various aspects of this disclosure may be employed in highly frequency-selective propagation channels. In other words, channels with very long delay spread, e.g., like 3GPP Pedestrian B, and channels with closely spaced paths of nearly equal strength. Such channels appear both in lab tests/operator tests as well as in usual drive tests. Generally, these kind of channels cannot be equalized by any linear equalizer without noise enhancement, i.e. degradation of the signal-to-noise ratio (SNR) at the equalizer output.

Various aspects of this disclosure may be implemented in any mobile communication system exhibiting inter-symbol interference and neighbour cell interference. Therefore, the receive branches 31, 32 of the receiver architecture as shown in FIG. 3, the receive branches 51, 52, 53 of the receiver architecture as shown in FIG. 5 or the receive branches 61, 62, . . . , 6n of the receiver architecture as shown in FIG. 6 may not include a despreader when the receiver is not based on code division multiple access, for example. Any of the mentioned receive branches may include alternative or additional components of a different RAT between equalizer and re-synthesizer that generate a signal from which the re-synthesizer can re-synthesize a transmit signal. Further note that the skilled person will appreciate that the allocation of re-synthesizer to a specific branch is just arbitrary. A re-synthesizer of specific receive branch may either re-synthesize a transmit signal that is provided to the cancellation filter of said receive or the re-synthesizer may be configured to re-synthesize a transmit signal that is provided to a subsequent receive branch.

In the following, various aspects of this disclosure will be illustrated:

Example 1 is a method for processing a receive radio signal. The method may include receiving in a mobile device a receive radio signal, equalizing the receive radio signal using a first equalizer to generate a first equalized receive radio signal, equalizing the receive radio signal using a second equalizer to generate a second equalized receive radio signal, re-synthesizing a transmit signal from the second equalized receive radio signal, calculating a subtraction signal based on the re-synthesized transmit signal, and subtracting the subtraction signal from the first equalized receive radio signal.

In Example 2, the subject matter of Example 1 can optionally include that calculating a subtraction signal based on the re-synthesized transmit signal includes filtering the re-synthesized transmit signal using a filter representing a residual multipath response of a radio channel.

In Example 3, the subject matter of Example 2 can optionally include that the filter representing the residual multipath response of a radio channel is given by a cascade of the radio channel and the first equalizer minus a correctly delayed Dirac delta impulse response of the cascade.

In Example 4, the subject matter of any one of Examples 1 to 3 can optionally include that the subtraction signal represents a multipath interference contained in the first equalized radio signal.

In Example 5, the subject matter of any one of Examples 1 to 4 can optionally include that the subtraction signal represents a neighbor cell interference contained in the first equalized radio signal.

In Example 6, the subject matter of any one of Examples 1 to 5 can optionally include that re-synthesizing the transmit signal includes: descrambling and despreading the equalized second receive signal to generate estimated transmit symbols, symbol detecting the transmit symbols, and re-spreading and re-scrambling the symbols to transmit chips.

In Example 7, the subject matter of any one of Examples 1 to 6 can optionally include that the first equalizer and the second equalizer are each configured as a minimum mean squared error filter.

In Example 8, the subject matter of any one of Examples 1 to 6 can optionally include that the first equalizer is configured as a matched filter of a radio channel via which the receive radio signals are received, and that the second equalizer is configured as a minimum mean squared error filter.

In Example 9, the subject matter of any one of Examples 1 to 6 can optionally include that the second equalizer is configured as minimum mean squared error filter, and that the first equalizer and the filter representing the residual multipath response are configured jointly as minimum mean squared error filter.

In Example 10, the subject matter of any one of Examples 1 to 9 can optionally include that re-synthesizing a transmit signal from the second equalized receive radio signal includes considering parts of the second equalized receive radio signal meeting a reliability criterion.

In Example 11, the subject matter of Example 10 can optionally include that parts of the second equalized receive radio signal are known parts of the second equalized receive radio signal.

In Example 12, the subject matter of Example 11 can optionally include that parts of the second equalized receive radio signal are pilot symbols.

In Example 13, the subject matter of any one of Examples 10 to 12 can optionally include that parts of the second equalized receive radio signal meeting a reliability criterion are parts of the second equalized receive radio signal that have been coded with a spreading factor exceeding a spreading factor threshold.

In Example 14, the subject matter of any one of Examples 10 to 13 can optionally include that parts of the second equalized receive radio signal meeting a reliability criterion are parts of the second equalized receive radio signal that have been received with a transmit power exceeding a transmit power threshold.

Example 15 is a method for processing a receive radio signal. The method may include receiving in a mobile device a receive radio signal, equalizing the receive radio signal using a first equalizer to generate a first equalized receive radio signal, equalizing the receive radio signal using a second equalizer to generate a second equalized radio receive signal, equalizing the receive radio signal using a third equalizer to generate a third equalized receive radio signal, re-synthesizing a first transmit signal from the third equalized receive radio signal by considering parts of the third equalized receive radio signal meeting a first reliability criterion to generate a first re-synthesized transmit signal, calculating a first subtraction signal based on the first re-synthesized transmit signal, subtracting the first subtraction signal from the second equalized receive radio signal, re-synthesizing a second transmit signal from the second equalized receive radio signal by considering parts of the second equalized receive radio signal meeting a second reliability criterion to generate a second re-synthesized transmit signal, calculating a second subtraction signal based on the second re-synthesized transmit signal, and subtracting the second subtraction signal from the first equalized receive radio signal.

In Example 16, the subject matter of Example 15 can optionally include that calculating the first subtraction signal based on the first re-synthesized transmit signal includes filtering the first re-synthesized transmit signal using a filter representing a residual multipath response of a radio channel.

In Example 17, the subject matter of Example 16 can optionally include that calculating the second subtraction signal based on the second re-synthesized transmit signal includes filtering the second re-synthesized transmit signal using a filter representing a residual multipath response of a radio channel.

In Example 18, the subject matter of any one of Examples 15 to 17 can optionally include that the filter representing the residual multipath response is given by a cascade of the channel and the corresponding equalizer minus a correctly delayed Dirac delta impulse response.

In Example 19, the subject matter of any one of Examples 15 to 18 can optionally include that any of the first and second subtraction signal represents a multipath interference contained in the first equalized signal or in the second equalized signal.

In Example 20, the subject matter of any one of Examples 15 to 19 can optionally include that any of the first and second subtraction signal represents a neighbour cell interference contained in the first equalized signal or in the second equalized signal.

In Example 21, the subject matter of any one of Examples 15 to 20 can optionally include that re-synthesizing the first and second transmit signal includes descrambling and despreading the first and second equalized receive radio signal to generate estimated transmit symbols, symbol detecting the transmit symbols, and re-spreading and re-scrambling the symbols to transmit chips.

In Example 22, the subject matter of any one of Examples 15 to 21 can optionally include that each equalizer is configured as a minimum mean squared error filter.

In Example 23, the subject matter of any one of Examples 15 to 21 can optionally include that the first equalizer is configured as a matched filter of a channel via which the receive radio signals are received, and that the second equalizer is configured as a minimum mean squared error filter.

In Example 24, the subject matter of any one of Examples 15 to 21 can optionally include that the second equalizer is configured as a matched filter of a channel via which the receive radio signals are received, and that the third equalizer is configured as a minimum mean squared error filter.

In Example 25, the subject matter of any one of Examples 15 to 21 can optionally include that any of the first, second or third equalizer is configured as minimum mean squared error filter and that minimizing a mean squared estimation error neglects estimation signal parts that have been subtracted in a preceding receive branch.

Example 26 is a receiver for a mobile radio communication device. The receiver may include a lowest receive branch. The lowest receive branch may include a second equalizer configured to equalize a receive radio signal to generate a second equalized receive radio signal, and a re-synthesizer configured to re-synthesize a transmit signal from the second equalized receive radio signal to generate a re-synthesized transmit signal. The receiver may further include a highest receive branch. The highest receive branch may include a first equalizer configured to equalize the receive radio signal to generate a first equalized receive radio signal, a filter configured to filter the re-synthesized transmit signal of a preceding receive branch to generate a subtraction signal, and a subtractor configured to subtract the subtraction signal from the first equalized receive radio signal.

In Example 27, the subject matter of Example 26 can optionally include that the receiver further includes at least one further receive branch arranged between the lowest receive branch and the highest receive branch. The at least one further receive branch may include an equalizer configured to equalize a receive radio signal to generate an equalized receive radio signal, a filter configured to filter a re-synthesized transmit signal of a preceding receive branch to generate a subtraction signal, a subtractor configured to subtract the subtraction signal from the equalized radio receive signal to generate a subtracted equalized radio receive signal, and a re-synthesizer configured to re-synthesize a transmit signal from the subtracted equalized receive radio signal to generate a re-synthesized transmit signal.

In Example 28, the subject matter of Example 26 can optionally include that the receiver further includes a plurality of cascaded receive branches arranged between the lowest receive branch and the highest receive branch. Each of the plurality of cascaded receive branches may include an equalizer configured to equalize a receive radio signal to generate an equalized receive radio signal, a filter configured to filter a re-synthesized transmit signal of a preceding receive branch to generate a subtraction signal, and a subtractor configured to subtract the subtraction signal from the equalized receive signal.

In Example 29, the subject matter of any one of Examples 27 or 28 can optionally include that the at least one other receive branch or each of plurality of cascaded receive branches includes a re-synthesizer configured to re-synthesize a transmit signal from a linearly or non-linearly equalized receive radio signal of the receive branch to generate a re-synthesized transmit signal.

In Example 30, the subject matter of Example 29 can optionally include that each filter represents a residual multipath response which is given by a cascade of the channel and the corresponding equalizer minus correctly delayed Dirac delta impulse response.

In Example 31, the subject matter of any one of Examples 26 to 30 can optionally include that any subtraction signal represents a multipath interference contained in a corresponding equalized signal.

In Example 32, the subject matter of any one of Examples 26 to 31 can optionally include that any subtraction signal represents a neighbor cell interference contained in a corresponding equalized signal.

In Example 33, the subject matter of any one of Examples 26 to 31 can optionally include that each receive branch further includes a descrambler/despreader configured to process each equalized signal to generate estimated transmit symbols, a symbol detector configured to detect the transmit symbols, and to re-spread and re-scramble the symbols to transmit chips.

In Example 34, the subject matter of any one of Examples 26 to 33 can optionally include that at least one of the receive branches includes a re-synthesizer configured to re-synthesize a transmit signal from an equalized receive radio signal by considering parts of the equalized receive radio signal meeting a reliability criterion.

In Example 35, the subject matter of Example 34 can optionally include that parts of the equalized receive radio signal are known parts of the equalized receive radio signal.

In Example 36, the subject matter of Example 35 can optionally include that parts of the equalized receive radio signal are pilot symbols.

In Example 37, the subject matter of Example 34 can optionally include that parts of the equalized receive radio signal meeting a reliability criterion are parts of the equalized receive radio signal that have been coded with a spreading factor exceeding a spreading factor threshold.

In Example 38, the subject matter of Example 34 can optionally include that parts of the equalized receive radio signal meeting a reliability criterion are parts of the equalized receive radio signal that have been received with a transmit power exceeding a transmit power threshold.

In Example 39, the subject matter of any one of Examples 26 to 38 can optionally include that an equalizer of a receive branch is configured to reconstruct noise contained in the receive branch, and wherein a subtractor of a succeeding receive stage is configured to subtract the reconstructed noise from an output of an equalizer of a succeeding stage.

In Example 40, the subject matter of Example 39 can optionally include that the equalizer of the succeeding receive branch is configured to ignore the reconstructed noise.

In Example 41, the subject matter of any one of Examples 26 to 40 can optionally include that an equalizer coefficient computation of an equalizer of a receive branch is configured to ignore parts of the receive radio signal that a subtractor of the receive branch subtracts.

In Example 42, the subject matter of any one of Examples 26 to 40 can optionally include that an equalizer coefficient computation of an equalizer of a receive branch is configured to ignore parts of the receive radio signal that a subtractor of a preceding receive branch subtracts.

In Example 43, the subject matter of Example 26 can optionally include that the preceding receive branch is the lowest receiver branch.

Example 44 is a mobile radio communication terminal device. The mobile radio communication terminal device may include a receiver. The receiver may include a lowest receive branch. The lowest receive branch may include a second equalizer configured to equalize a receive radio signal to generate a second equalized receive radio signal, and a re-synthesizer configured to re-synthesize a transmit signal from the second equalized receive radio signal to generate a re-synthesized transmit signal. The receiver may further include a highest receive branch. The highest receive branch may include a first equalizer configured to equalize the receive radio signal to generate a first equalized receive radio signal, a filter configured to filter the re-synthesized transmit signal of a preceding receive branch to generate a subtraction signal, and a subtractor configured to subtract the subtraction signal from the first equalized receive radio signal. The mobile radio communication terminal device may further include an application processor coupled to the receiver.

Example 45 is a computer readable medium including computer readable instructions to carry out a method for processing a receive radio signal. The method may include receiving in a mobile device a receive radio signal, equalizing the receive radio signal using a first equalizer to generate a first equalized receive radio signal, equalizing the receive radio signal using a second equalizer to generate a second equalized receive radio signal, re-synthesizing a transmit signal from the second equalized receive radio signal, calculating a subtraction signal based on the re-synthesized transmit signal, and subtracting the subtraction signal from the equalized receive radio signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a receive radio signal, the method comprising:
   receiving in a mobile device a receive radio signal;
   equalizing the receive radio signal using a first equalizer to generate a first equalized receive radio signal;
   equalizing the receive radio signal using a second equalizer to generate a second equalized receive radio signal;
   calculating a second subtraction signal based on a second re-synthesized transmit signal;
   subtracting the second subtraction signal from the second equalized receive radio signal to generate a second subtracted equalized receive radio signal;
   re-synthesizing a transmit signal from the second subtracted equalized receive radio signal;
   calculating a first subtraction signal based on the re-synthesized transmit signal; and
   subtracting the first subtraction signal from the first equalized receive radio signal.

2. The method according to claim 1,
   wherein calculating the first subtraction signal and/or the second subtraction signal based on the re-synthesized transmit signal comprises filtering the re-synthesized transmit signal using a filter representing a residual multipath response of a radio channel.

3. The method according to claim 1,
   wherein the first subtraction signal and/or second subtraction signal represents a multipath interference contained in the first equalized radio signal.

4. The method according to claim 1,
   wherein re-synthesizing the transmit signal comprises:
   descrambling and despreading the equalized second receive signal to generate estimated transmit symbols; and
   symbol detecting the transmit symbols; and
   re-spreading and re-scrambling the symbols to transmit chips.

5. The method according to claim 1,
   wherein the first equalizer and the second equalizer are each configured as a minimum mean squared error filter.

6. The method according to claim 1,
   wherein the first equalizer is configured as a matched filter of a radio channel via which the receive radio signals are received, and wherein the second equalizer is configured as a minimum mean squared error filter.

7. The method according to claim 1,
wherein the second equalizer is configured as minimum mean squared error filter; and
wherein the first equalizer and a filter representing the residual multipath response are configured jointly as minimum mean squared error filter.

8. The method according to claim 1,
wherein re-synthesizing the transmit signal from the second equalized receive radio signal comprises considering parts of the second equalized receive radio signal meeting a reliability criterion.

9. A receiver for a mobile radio communication device comprising:
one or more lower receive branches, comprising:
a second equalizer configured to equalize a receive radio signal to generate a second equalized receive radio signal;
a second filter configured to filter a second re-synthesized transmit signal to generate a second subtraction signal; and
a second subtractor configured to subtract the second subtraction signal from the second equalized receive radio signal to generate a second subtracted equalized radio receive signal;
wherein the one or more lower receive branches is either a lowest branch or an intermediate branch between the highest branch and the lowest branch; and
a re-synthesizer configured to re-synthesize a transmit signal from the second subtracted equalized receive radio signal;
a highest receive branch comprising:
a first equalizer configured to equalize the receive radio signal to generate a first equalized receive radio signal;
a first filter configured to filter the re-synthesized transmit signal to generate a first subtraction signal; and
a first subtractor configured to subtract the first subtraction signal from the first equalized receive radio signal.

10. The receiver according to claim 9, wherein the one or more lower receive branches comprises:
a plurality of cascaded receive branches arranged between the lowest receive branch and the highest receive branch.

11. The receiver according to claim 10,
wherein the one or more receive branches of the plurality of cascaded receive branches further comprises a second re-synthesizer configured to re-synthesize a transmit signal from a linearly or non-linearly equalized receive radio signal of the preceding receive branch branches to generate the re-synthesized transmit signal.

12. The receiver according to claim 9,
wherein the subtraction signal represents a neighbor cell interference contained in a corresponding equalized signal.

13. The receiver according to claim 9,
each receive branch further comprising:
a descrambler/despreader configured to process each equalized signal to generate estimated transmit symbols; and
a symbol detector configured to detect the transmit symbols; and re-spreading and re-scrambling the symbols to transmit chips.

14. The receiver according to claim 9,
wherein the re-synthesizer is configured to re-synthesize the transmit signal by considering parts of the second equalized receive radio signal meeting a reliability criterion.

15. The receiver according to claim 14,
wherein parts of the second equalized receive radio signal meeting a reliability criterion are parts of the second equalized receive radio signal that have been coded with a spreading factor exceeding a spreading factor threshold.

16. The receiver according to claim 9,
wherein each equalizer of each receive branch is configured to reconstruct noise contained in each respective receive branch, and wherein a subtractor of a succeeding receive stage is configured to subtract the reconstructed noise from an output of an equalizer of a succeeding stage.

17. The receiver according to claim 9,
wherein an equalizer coefficient computation for each equalizer of each receive branch is configured to ignore parts of the respective receive radio signal subtracted by a subtractor of the respective receive branch.

18. The receiver according to claim 9,
wherein each equalizer coefficient computation of each equalizer of the respective receive branch is configured to ignore parts of the respective receive radio signal subtracted by a subtractor of a preceding receive branch subtracts.

19. A mobile radio communication terminal device, comprising:
a receiver, comprising:
one or more lower receive branches, comprising:
a second equalizer configured to equalize a receive radio signal to generate a second equalized receive radio signal;
a second filter configured to filter a second re-synthesized transmit signal to generate a second subtraction signal;
a second subtractor configured to subtract the second subtraction signal from the second equalized receive radio signal to generate a second subtracted equalized radio receive signal; and
a re-synthesizer configured to re-synthesize a transmit signal from the second subtracted equalized receive radio signal to generate a re-synthesized transmit signal; and
a highest receive branch comprising:
a first equalizer configured to equalize the receive radio signal to generate a first equalized receive radio signal;
a first filter configured to filter the re-synthesized transmit signal of a preceding receive branch to generate a first subtraction signal; and
a first subtractor configured to subtract the first subtraction signal from the first equalized receive radio signal;
an application processor coupled to the receiver.

* * * * *